United States Patent [19]
Schofield, Jr. et al.

[11] 3,970,846
[45] July 20, 1976

[54] PRESENCE DETECTING SYSTEM WITH SELF-CHECKING

[75] Inventors: George L. Schofield, Jr.; James L. Lignell, both of Ann Arbor, Mich.

[73] Assignee: Xenex Corporation, Woburn, Mass.

[22] Filed: Aug. 15, 1974

[21] Appl. No.: 497,014

Related U.S. Application Data

[63] Continuation of Ser. No. 410,861, Oct. 29, 1973, abandoned.

[52] U.S. Cl. .............................. 250/221; 250/209; 340/258 B
[51] Int. Cl.² ........................................ G01D 21/04
[58] Field of Search .......... 250/208, 209, 221, 222; 317/127; 340/258 B; 343/5 PD

[56] References Cited
UNITED STATES PATENTS

| | | | |
|---|---|---|---|
| 3,478,220 | 11/1969 | Milroy | 250/221 |
| 3,723,738 | 3/1973 | Brenner et al. | 343/5 PD |
| 3,742,222 | 6/1973 | Endl | 340/258 B |
| 3,764,813 | 10/1973 | Clement et al. | 250/221 |
| 3,805,061 | 4/1974 | De Missimy et al. | 250/209 |

Primary Examiner—Alfred E. Smith
Assistant Examiner—D. C. Nelms
Attorney, Agent, or Firm—Reising, Ethington, Barnard, Perry & Brooks

[57] ABSTRACT

This invention relates to presence sensing systems and more particularly to such systems which utilize beams of radiant energy, such as light beams, to detect the presence of a person or an object within a predetermined space. Additionally the invention relates to presence detecting systems combined with self-checking means to ensure that the detection system is operating properly.

6 Claims, 5 Drawing Figures

TIMING DIAGRAM

PRESENCE DETECTING SYSTEM WITH SELF-CHECKING

This is a continuation of application Ser. No. 410,861, filed Oct. 29, 1973, now abandoned.

BACKGROUND OF THE INVENTION

There are many practical uses for systems which automatically detect the presence of an object or a person within a predetermined space; such systems are herein referred to as presence detecting systems whereas the technical literature and various patents sometimes refer to such systems as intrusion detecting systems. Presence detection systems have a wide variety of applications or uses which for the most part may be regarded as so-called "security systems" or as so-called "safety systems". A security system, such as a burglar alarm, is adapted to sense the unauthorized presence and sound an alarm when a person or other intruder is within a given zone which is to be secured against unauthorized presence or intrusion. When a presence detection system is employed as a safety system it is adapted to help safeguard a person against injury by some hazardous device; it is commonly employed with industrial machines to stop the machine or give a warning when an object or a person is in a hazardous position. In such applications the prior art presence detection systems have been unsatisfactory in several respects. For example, there has been a need for a presence detection system which is substantially immune to ambient conditions and false signals and yet which responds without fail to a genuine signal. Furthermore, because of the nature of the use of such systems there is need to provide self-checking of the system operability so that failure thereof is made known so that further reliance will not be placed on the system.

Presence detection systems have heretofore been proposed using radiant energy or light beams to define a boundary of the space or region which is to be guarded or maintained under surveillance. Such systems generally utilize one or more light sources and one or more light sensors so that interruption of the light therebetween is adapted to produce a control signal indicative of the presence of an object in the guarded region. Such a light beam system is admirably suited to machine safety systems in that it provides a well defined boundary for the guarded region. Thus the machine operator is given complete freedom of movement on the safe side of the boundary or barrier and the safety system is unaffected by movement of materials and equipment in close proximity of the boundary; however, even the slightest penetration of the boundary will cause the safety system to respond.

The prior art photoelectric presence sensing systems have used a wide variety of arrangements of light sources and photodetectors to provide a light barrier plane or "curtain". Typical of such systems is a linear array of multiple light sources and an opposed linear array of photodetectors, each of which is aligned with one of the light sources. The light sources are energized simultaneously and repetitively in a pulsing fashion and the photodetector output signals are suitably processed to determine whether any of the photodetectors are not illuminated during each pulsing interval. Such an arrangement is shown in the MacDonald U.S. Pat. No. 3,704,396. A similar arrangement is shown in the Endl U.S. Pat. No. 3,742,222. It has also been proposed to provide a light curtain by sequentially energizing sources which are disposed in a linear array; more particularly spaced columns are each provided with alternating light sources and photodetectors and the light from the source in one column is received by the opposed photodetector in the other column, which causes the adjacent source to be energized to send light to the next receiver in the first column and so on to the ends of the columns, then the cycle is repeated. In such systems there is a serious problem of crosstalk between channels, i.e. the paths between a light source and its associated photodetector. Furthermore, the sequential switching arrangement depends upon each light source and photodetector being operative in order to complete a cycle.

One of the difficulties in the photodetector type of presence sensing systems has been the effect of changes in ambient conditions, especially changes in ambient light. Several schemes have been proposed in the prior art to provide some degree of immunity of the system to such ambient light changes. For example, one such scheme discriminates between ambient light change and signal light change on the basis of the time rate of change and circuitry is provided to develop an output corresponding to the signal light change only. Such an arrangement is disclosed in the aforementioned MacDonald U.S. Pat. No. 3,704,396. Other prior art systems provide modulation of the light at a predetermined frequency and utilize a tuned receiver circuit to discriminate between the ambient and signal light changes. This kind of system is disclosed in the Bagno U.S. Pat. No. 3,370,284.

The need for self-checking provisions in presence detection systems has been alluded to above. The prior art patents relating to presence detection systems have disclosed some degree of self-checking. For example, it is known to provide self-checking by subjecting the presence detection system to a simulated occurrence of object presence to determine whether the system responds correctly. A system of this type is disclosed in the Engh U.S. Pat. No. 3,543,260. Failsafe operation, as distinguished from self-checking, has also been provided in presence detection systems, such as that shown in the Woodward U.S. Pat. No. 3,242,341.

SUMMARY OF THE INVENTION

In accordance with this invention a presence detection system of the photodetecting type is provided which produces an effectively continuous curtain of light to define a boundary of a guarded region; the curtain of light being produced with closely spaced light channels without interchannel interference or cross-talk. This is accomplished by a multiplexing arrangement in which successive channels, each including a light source and photodetector, are activated sequentially and a light pulse is transmitted during the activation of each channel. This enables operation of the system with a high signal to noise ratio because adjacent channels are not susceptible to interference from the activated channel. Furthermore, the multiplexing arrangement permits operation of the light sources at high energy levels, i.e. each source is driven hard but is operated at a low duty cycle. This further enables operation of the system with wide spacing between the light source and photodetector of each channel. Additionally, the multiplexing arrangement is especially adapted to selective cut-off of any desired channels in order to achieve variable spacing between the channels.

Additionally this invention provides a photoelectric type presence detection system which is substantially unaffected by ambient light conditions, ambient temperature changes, or variations in response characteristics of the photodetector elements. This is accomplished by utilizing phototransistors as the sensing elements and providing a feedback loop to control the bias level of the phototransistors to maintain immunity to ambient changes and uniform response to signal inputs. By reason of the multiplexing arrangement a single feedback loop is connected with the phototransistors successively and is capable of controlling the bias for the entire set of phototransistors.

This invention additionally provides a self-checking system for the presence detection system to ensure that the operator will not rely upon the presence detection system for protection if in fact a malfunction has occurred in the detection system. In general this is accomplished by selection of test points in the detection system which have a known binary state at a given operating point in the operating cycle for each channel when the system is functioning properly. If the predetermined binary states at the given operating point do not all occur, a malfunction is indicated and the system is automatically shut down with suitable warning to the operator. This self-checking system is especially advantageous in conjunction with the arrangement which enables individual checking of each channel during each cycle with a minimum of system components and wiring extending between the light source and photodetector sides of the light curtain.

Additionally, the inventive system is provided with fail-safe provisions.

A more complete understanding of this invention may be obtained from the detailed description that follows, taken with the accompanying drawings in which.

Figure 4A:
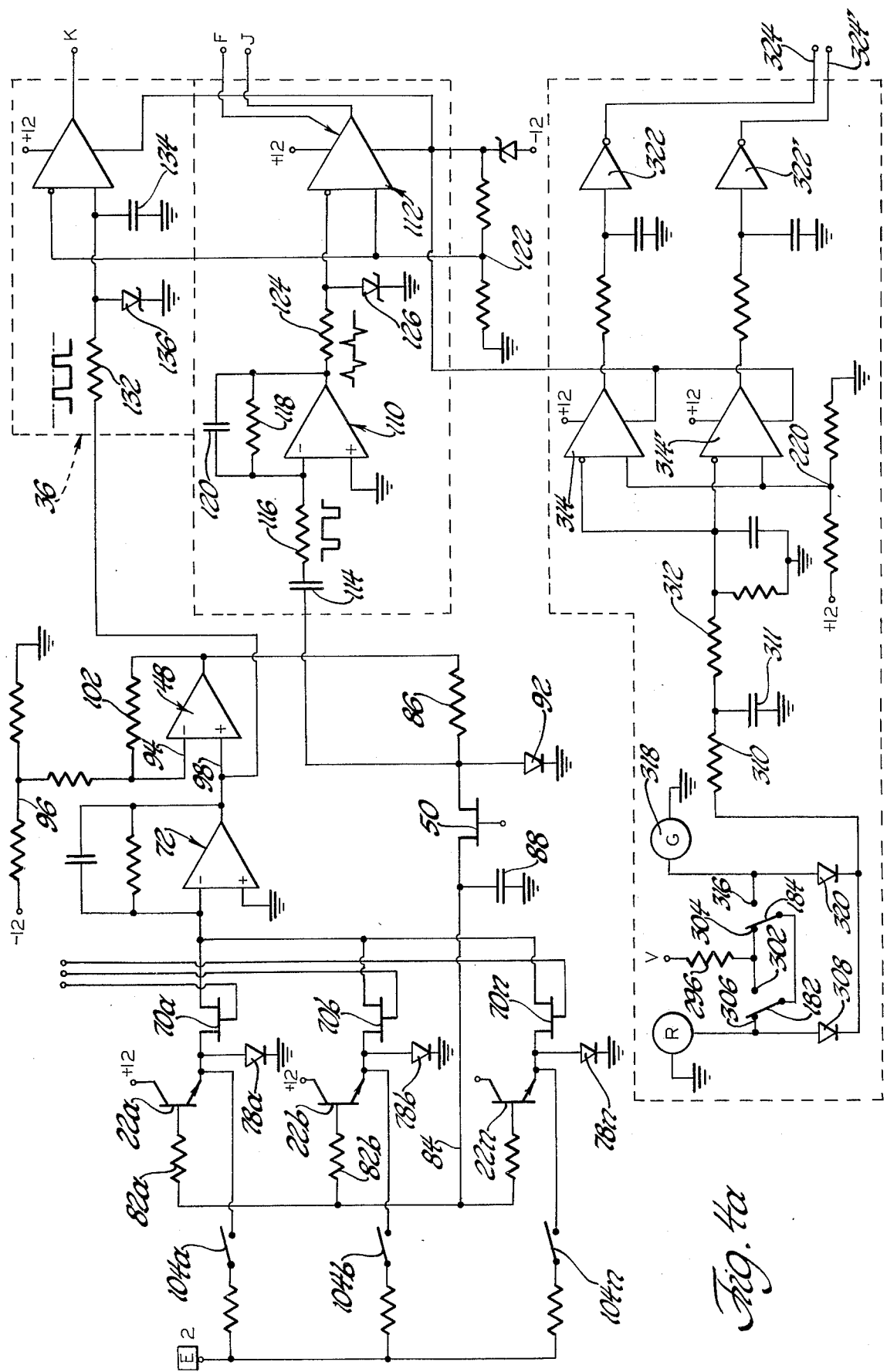
Figure 4B:
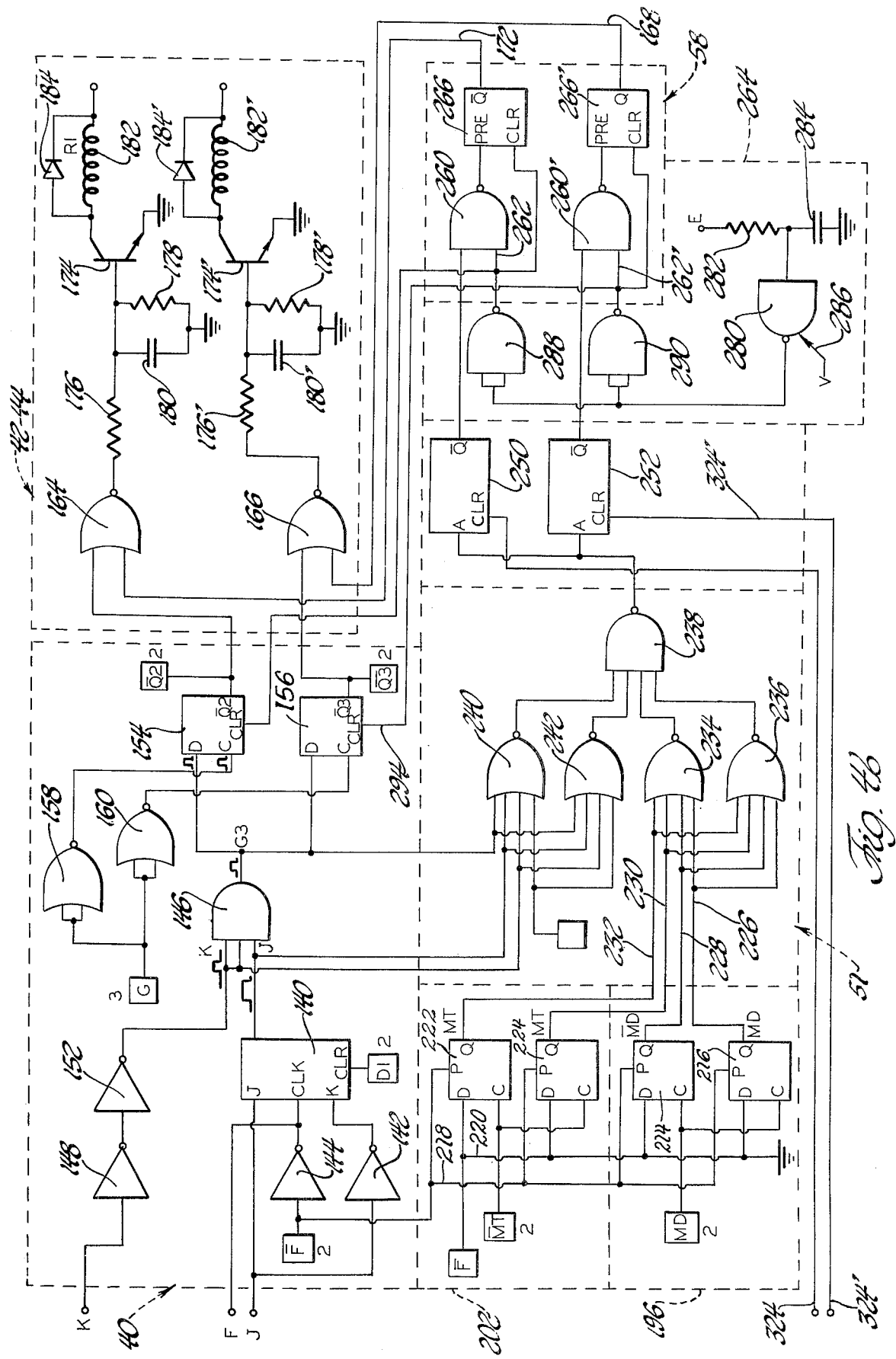

FIG. 4a and 4b taken together show certain details of the system.

DETAILED DESCRIPTION

Referring now to the drawings there is shown an illustrative embodiment of the invention in a presence sensing system especially adapted for use in a machine safety control system. It will be appreciated as the description proceeds that the invention may be used in a wide variety of other applications. Further, it is noted that the illustrative embodiment of the invention utilizes light emitting diodes which radiate predominantly in the infra-red portion of the spectrum. It is to be understood, of course, that the term "light" is used herein to mean radiant energy whether or not it is visible to the human eye.

Figure 1:
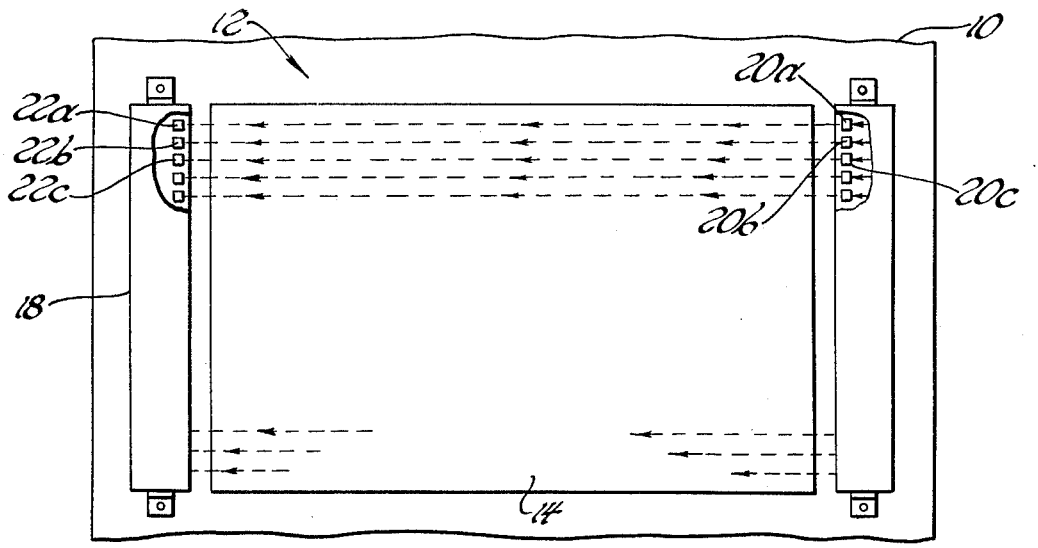
FIG. 1 shows the physical arrangement of the presence detection on a machine.

As shown in FIG. 1 the presence detection system of this invention is installed on a machine 10, such as a punch press, which has a "pinch-point" or other hazard in a region on the machine which is to be protected. In such machine safety control systems it is desired to shield the protected region by a "barrier" defined by the presence detection system which in case of penetration of the barrier by the hand of the operator or other object, will cause the machine to come to an immediate stop. As shown in FIG. 1 the presence detection system 12 is mounted on the machine so as to provide a light curtain which extends across an access opening to the so-called pinch-point in the machine. The presence sensing system comprises a transmitting or sender pylon or mast 16 disposed on one side of the access opening 14 and a receiver pylon or mast 18 on the other side. Within the sender mast 16 are disposed a plurality of closely spaced light sources in the form of light emitting diodes 20a, 20b, 20c, etc. mounted in a linear array upon a circuit board. The mast 18 houses a plurality of photodetector elements in the form of phototransistors 22a, 22b, 22c etc. which are the same in number as the light emitting diodes. It is noted that the light emitting diode 20a is positioned so that its light beam extends across the opening 14 and impinges upon the sensing element of the phototransistor 22a and thus the diode and transistor constitute a set which defines a channel for transmission and reception of a light beam. Similarly, the light emitting diode 20b and the phototransistor 22b form another set, light emitting diode 20c and phototransistor 22c form another set, and so on, with the additional light emitting diodes and phototransistors which define a plurality of light transmitting and receiving channels. It is noted further in FIG. 1 that the light beams from the light emitting diodes are represented as forming a curtain of light across the opening 14; it is pointed out, however, that only one such light beam occurs at a time and the beams occur in such rapid succession, so far as human reaction or response is concerned, the light beams may be considered as being present simultaneously. However, it will be appreciated as the description proceeds that in the electronic circuitry of the system the timing and response time is such that the nonsimultaneous occurrence of the light beams is a significant feature of operation.

With further reference to FIG. 1, it is noted that in such a machine safety control system it is desired to cause the machine operation to stop immediately if the operator's hand or other object is positioned in the path of anyone or several of the discrete light beams of the light curtain. The electronic circuitry for providing such operation is suitably housed in the masts 16 and 18 with a few connecting wires extending therebetween.

Figure 3:
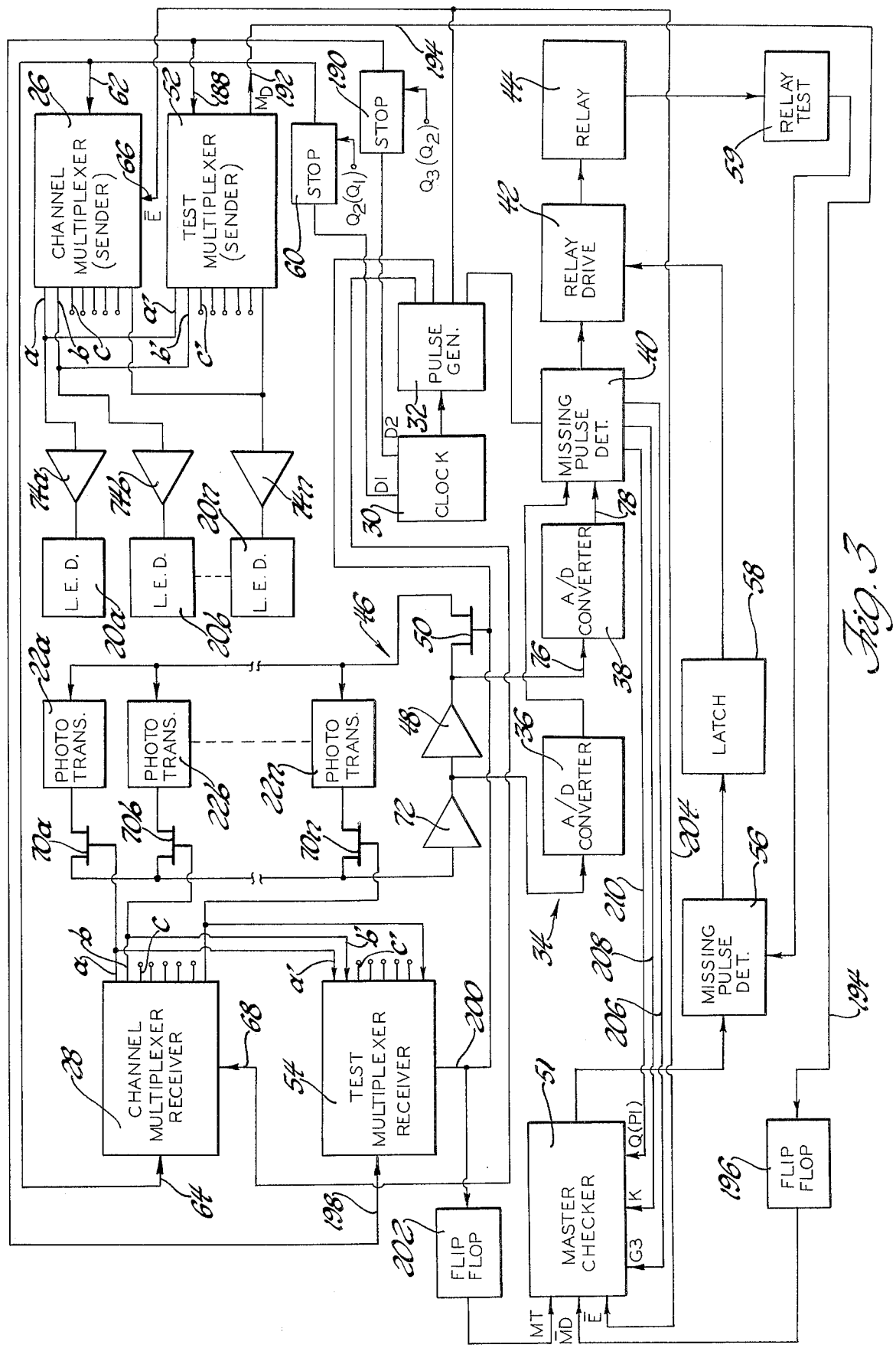
FIG. 3 is a block diagram showing the entire presence detection system.

The electronic circuits of the presence detection system are shown in block diagram in FIG. 3. The system comprises, in general, a control subsystem and a self-checking subsystem which are interdependent as will be seen from the description that follows. The control subsystem comprises, in general, the plurality of light emitting diodes 20a, 20b . . . and 20n and the plurality of phototransistors 22a, 22b . . . and 22n, each phototransistor being optically aligned with a particular light emitting diode to form a set with the several sets defining a plurality of channels which may be designated as channels a, b, . . . and n. The control subsystem further comprises a sender channel multiplexer 26, a receiver channel multiplexer 28 which under the control of a clock 30 are operative to activate the channels a, b, . . . and n successively. A pulse generator 32 under the control of the clock provides successive energizing pulses for the light emitting diodes as the respective channels are activated and the signals produced by the phototransistors are successively applied to pulse detection means 34 including analog to digital converters 36 and 38 and a missing pulse detector 40. For control purposes the output of the missing pulse detector is applied through a relay drive 42 to control relays 44. The control subsystem further includes a feedback loop 46 which comprises a feedback amplifier 48, an electronic switch in the form of a field effect transistor 50 (controlled by the pulse generator 32) and the loop further extends to the base electrodes of the phototransistors. The control subsystem will be described in further detail subsequently.

The self-checking subsystem referred to above comprises, in general, a master checker 51 which accepts test signals under the control of the pulse generator from selected operating points in the system. The self-checking subsystem also comprises a sender test multiplexer 52 and a receiver test multiplexer 54 which are employed to produce test signals for the master checker. Additionally, test signals are derived from the pulse generator 32 and indirectly from the missing pulse detector 40 for input to the master checker. The self-checking subsystem further comprises a missing pulse detector 56 which has an input connected with the output of the master checker and another input connected with a relay test stage 59. The output of the missing pulse detector 56 is connected through a latch 58 to a relay drive 42. The self-checking subsystem will be described in further detail subsequently.

Figure 2:
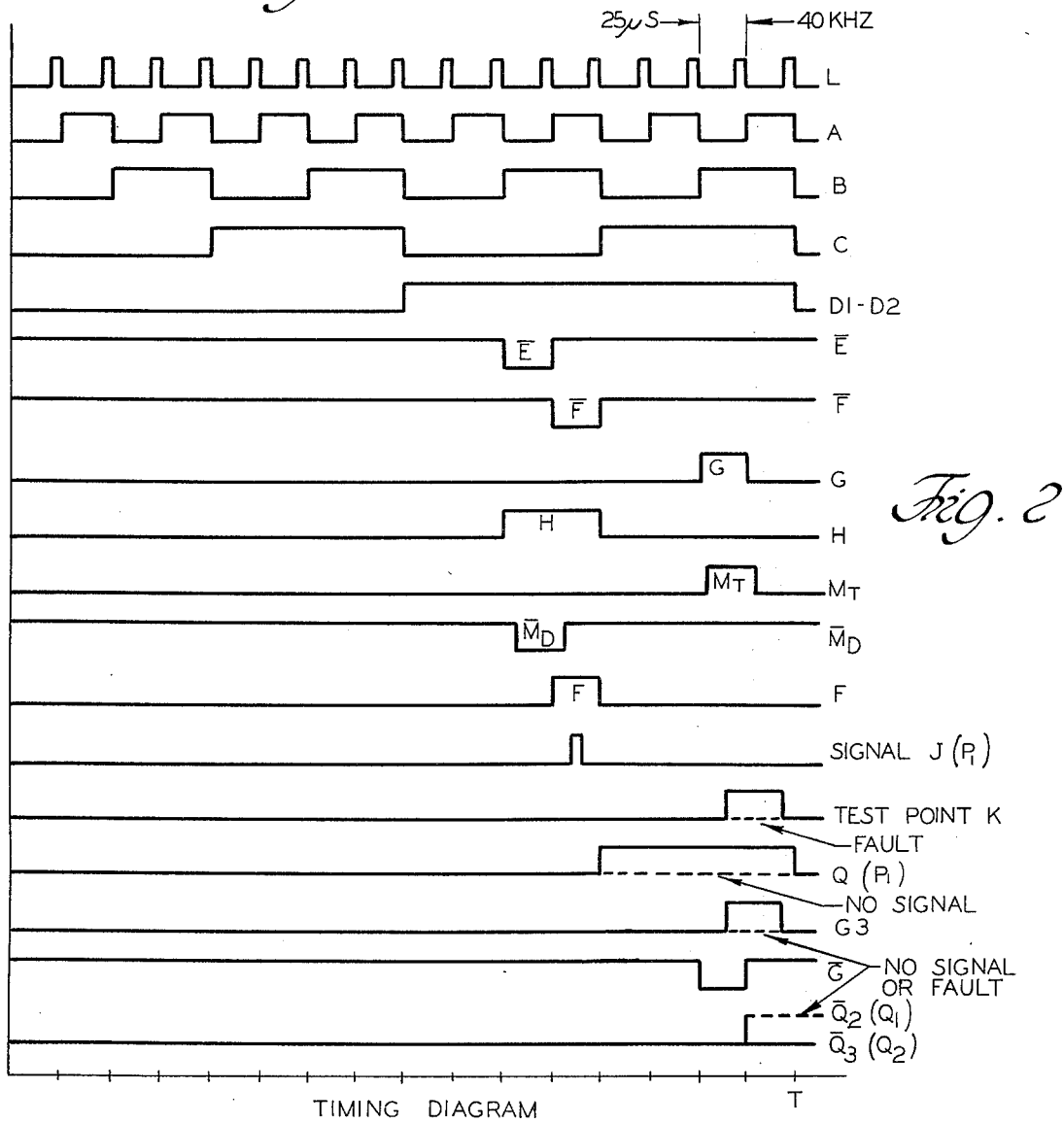
FIG. 2 is a timing diagram of the electrical waveforms in the system.

It will now be helpful to consider the control subsystem in greater detail and especially taken in conjunction with the timing diagram of FIG. 2. First it is noted that the control subsystem is operative through the sender channel multiplexer 26 and the receiver channel multiplexer 28, together with the clock 30 and the pulse generator 32 to sequentially activate the channels $a, b, \ldots$ and $n$, and during the period of activation for each channel the light emitting diode therein is energized with a pulse. If there is no obstruction in the given channel the corresponding phototransistor is effective to produce a corresponding output pulse. The timing diagram of FIG. 2 illustrates the significant events during a complete cycle of operation for a single channel. Each such cycle has a time duration T which in the illustrative embodiment is 400 microseconds. It will be understood that the number of channels to be used in a given installation will depend upon the particular requirements such as the area to be covered and the spacing between adjacent beams. The illustrative embodiment of the invention is adaptable to any desired number of channels with the selected number preferably being a multiple of eight since the multiplexer units are commercially available in integrated circuit chips with eight channels per chip. With the channel cycle time T being equal to 400 microseconds the basic clock frequency is 40 kilohertz. As shown in the timing diagram the basic timing signal L therefore is a train of pulses having an interval between pulses of 25 microseconds. The clock 30 includes frequency divider circuits which internally produce clock signals A, B, C. D1 and D2 which successively represent division by two of the basic clock frequency. The clock signals D1 and D2 are identical and as noted in FIG. 3, the clock signal D1 is applied through a stop switch 60 to the channel address input 62 of the sender channel multiplexer 26 and also to the channel address input 64 of the receiver channel multiplexer 28. The multiplexer 26 is responsive to the occurrence of the negative-going portion of the clock signal D1 at the address input 62 to cause the internal channel switching means to advance the connection of the input 66 from one channel output to the next channel output. Similarly, the occurrence of the negative-going portion of the clock signal D1 at the input 64 of the multiplexer 28 causes the internal switching means to advance the connection of the input 68 from one channel output to the next channel output. For purposes which will be described later in each of the channels $a, b, \ldots$ and $n$, includes an electronic switch in the form of field effect transistors $70a, 70b, \ldots$ and $70n$, respectively. In channel $a$ the field effect transistor has its source and drain electrodes connected serially between the output of the phototransistor and the input of a preamplifier 72. The gate electrode of the field effect transistor $70a$ is connected with the channel $a$ output of the multiplexer 28. Similarly, the field effect transistor $70b$ has its source and drain electrode connected serially between the output of the phototransistor $22b$ and the input of the preamplifier 72 while the gate electrode is connected with the channel output $b$ of the multiplexer 28. Similar connections are made for the field effect transistors in the remaining channels.

Referring again to the timing diagram of FIG. 2 it is noted that the pulse generator 32 produces a train of driver pulses $\overline{E}$ with one such pulse occurring during each channel cycle. It is noted in the timing diagram that the pulse $\overline{E}$ occurs somewhat after the midpoint of the cycle. Thus assuming that the channel multiplexers 26 and 28 have just completed a cycle of operation on channel $a$, the clock signal D1 at the channel address inputs 62 and 64 of the multiplexers cause the input 66 to be connected with the channel output $b$ in the multiplexer 26 and the channel input 68 to be connected with the channel output $b$ of the multiplexer 28. Accordingly, the channel $b$ is activated and, during its active period, i.e. the cycle time T, the pulse $\overline{E}$ is applied from the pulse generator 32 through the input 66 of the multiplexer 26 and thence through the channel output $b$ and through the driver amplifier $74b$ to the input of the light emitting diode $20b$. At this time the channel switch for channel $b$, i.e. field effect transistor $70b$ is closed by the internal bias signal provided by the channel multiplexer 28 which by reason of the clock signal D1 has its input 68 connected with a channel output $b$ throughout the duration of the cycle for channel $b$. It is noted with reference to the timing diagram of FIG. 2 that the pulse generator 32 produces a train of pulses G with one such pulse occurring during each channel cycle at a point late in the cycle. Accordingly, the channel switch $70b$ remains closed except during the pulse G for purposes which will be discussed subsequently.

When the driver pulse $\overline{E}$ occurs during the channel cycle of channel $b$ when there is no obstruction in the light path the phototransistor $22b$ will produce an output pulse corresponding to the pulse $\overline{E}$ and the output pulse will be applied through the preamplifier 72 to the input of the feedback amplifier 48. The output of the feedback amplifier is applied to the input 76 of the analog to digital converter 38. (At this time, i.e. during the driver pulse $\overline{E}$ the feedback switch, i.e. the field effect transistor 50, is open and the feedback circuit 46 is inactive. Note on the timing diagram that a switching pulse H occurs simultaneously with the driver pulse $\overline{E}$ and has a longer duration than $\overline{E}$ and is produced by the pulse generator 32.) The operation of the pulse detection means 34, alluded to briefly above, will be described further below. For the time being, suffice it to say, that when the driver pulse E applied to the light emitting diode 20b causes the phototransistor 22b to produce an output pulse, the system will continue to operate normally through the remainder of the channel b cycle and commence the channel c cycle under the control of the clock pulse D1. Thus the channel multiplexers 26 and 28 step through the channel cycles in sequence and a train of output pulses is applied to the input 76 of the coverter 38 and a corresponding train of pulses is applied to the input 78 of the missing pulse detector 40. So long as all pulses in the pulse train are present the missing pulse detector 40 maintains the relay 44 energized and thus the machine continues to run. However, if an obstruction occurs in one of the light transmission channels, such as an operator's hand, the phototransistor of that channel will fail to produce a pulse during that channel cycle and the train of pulses at the input 78 of the missing pulse detector 40 will have a missing pulse and the detector 40 will cause the relay 44 to be deenergized. When the relay 44 is deenergized the machine is immediately stopped. As will appear subsequently, the machine cannot be restarted until the operator has removed his hand from the light curtain and has reset the control circuit.

It will now be helpful to consider the phototransistor circuits in greater detail, particularly with reference to the manner of providing immunity against changes in ambient conditions, such as light and temperature. As previously mentioned, this is provided by the feedback loop 46 depicted generally in FIG. 3. The feedback loop is shown in detail in the diagram of FIG. 4a. In this diagram the phototransistors 22a, 22b and 22n are shown in schematic fashion to illustrate the biasing arrangement. The collector of each phototransistor is connected with a source of positive voltage and the emitter is connected through the channel switching field effect transistor to a common bus and thence to an input of the preamplifier 72. Voltage limiting diodes 78a, 78b, and 78n are connected respectively across the field effect transistors 70a, 70b, and 70n in conventional manner. The base of the phototransistor 22a is connected through a limiting resistor 82a to a common connnector 84 and thence through the feedback switching field effect transistor 50 and a resistor 86 to the output of the feedback amplifier 48. Thus it can be seen that during the time that the feedback switching transistor 50 is conductive, the bias on the base of the phototransistor 22a is determined by the output of the feedback amplifier 48. Similarly, the base of phototransistor 22b is connected through a resistor 82b, the common conductor 84, feedback switching transistor 50 and the resistor 86 to the output of the amplifier 48. The remaining phototransistors including 22n are connected in the same manner to the output of the feedback amplifier 48. It is noted that the channel switching transistor 50 is provided with a capacitor 88 across its drain electrode and a voltage limiting diode 92 across its source electrode. As previously described with reference to FIG. 3, the gate electrode of the transistor 50 is connected with the pulse generator 32 to receive the feedback switching pulse H. As noted in the timing diagram of FIG. 2, during each channel cycle the switching pulse H has a leading edge coincidental with the leading edge of the driving pulse E and a trailing edge occuring later than the trailing edge of the driving pulse. During the pulse H the feedback switch 50 is open and thus the output of the feedback amplifier during this time is not applied to the biasing circuits of the phototransistors. However, during each channel cycle prior to and after the occurrence of the pulse H the output of the feedback amplifier 48 is applied through the channel switch 50 to the biasing circuit for the phototransistor in the activated channel. Assume, for example, that the multiplexer under clock control has activated channel b, and accordingly the phototransistor 22b is connected through its channel switching transistor 70b to the input of the preamplifier 72, the output of which is applied to the input of the feedback amplifier 48. During the portion of the channel cycle prior to the leading edge of pulse H the feedback switching transistor 50 is conductive. It is noted that the feedback amplifier 48 takes the form of a differential or comparator amplifier, The amplifier 48 is provided with a reference voltage input 94 which is connected with a reference voltage source 96. The signal input 98 of the amplifier 48 is connected with the output of the preamplifier 72. A feedback resistor 102 is connected between the output of the feedback amplifier 48 and the reference voltage input 94. In this arrangement the feedback amplifier 48 functions to maintain the output at such a voltage that the signal voltage applied to the signal input 98 will be equal in magnitude and the same polarity to the reference voltage at the input 94. Accordingly, the voltage applied by the output of the feedback amplifier 48 through the feedback switch 50 to the base of the phototransistor 22b will vary in accordance with variations in the output of the phototransistor 22b due to ambient conditions in the absence of a light pulse signal from the light emitting diode 20b. If, for example, the ambient light falling upon the phototransistor 22b or the ambient temperature should increase the output of the phototransistor due to such change would increase and the signal voltage input to the feedback amplifier 48 would become now negative. This will result in an increase in the negative feedback of the amplifier and the bias voltage applied to the base of phototransistor 22b will be reduced until the signal voltage input to the feedback amplifier 48 is again caused to be equal in magnitude to the reference voltage input. The storage capacitor 88 is charged to a voltage corresponding to the output of the feedback amplifier 48 during the interval prior to the leading edge of the feedback switching pulse H. During the occurrence of the feedback switching pulse H, and hence the period when the feedback switching transistor 50 is open or nonconductive, the bias voltage applied to the base of the phototransistor 22b is the voltage across capacitor 88 and hence approximatley at the value determined by ambient conditions just prior to the driver pulse E which energizes the light emitting diode 20b to produce the light pulse signal for the phototransistor 22b. In addition to compensating for changes in ambient light and temperature the feedback circuit 46 is also effective to cause each phototransistor to produce a substantially identical response to that produced by the other phototransistors, even though the phototransistors are not identically matched in characteristics. In other words, uniform response may be obtained from phototransistors which have the normal variations form uniform characteristics among the individual transistors in a given batch.

Another feature of considerable practical advantage in adapting the presence detection system to a particular application is that of being able to selectively shut off one or more channels of the light curtain. This is accomplished in a simple manner by providing a simulated output signal from the phototransistor in the channel which is to be shut off. As shown in FIG. 4a, each of the transistors 22a, 22b and 22n is connected respectively through a shutoff switch 104a, 104b and 104n and suitable isolating resistors to the $\bar{E}$ output of the pulse generator 32. Accordingly, when a given channel is desired to be shut off, such as channel b, the switch 104b is closed manually and the driver pulse $\bar{E}$ is applied through the preamplifier 72 and the feedback amplifier 48 to the pulse detection means 34. Thus, even though the transmission channel b is obstructed and the light pulse from the light emitting diode 20b does not reach the phototransistor 22b, a pulse which simulates the output of the phototransistor 22b is provided and there is no missing pulse corresponding to the selected channel in the train of pulses applied to the missing pulse detector 40. Accordingly, the selected channel is effectively shut off. It will be appreciated that selective shut off of channels in a given installation is advantageous where it is desired, for example, to perform maintenance or tryout operation on the machine or where there is a change of workpiece feeding.

It will now be helpful to consider the pulse detection means 34 in greater detail as shown in FIGS. 4a and 4b. As previously described with reference to FIG. 3 the output of the preamplifier 72 and the output of the feedback amplifier 48 are both pulse trains produced by the successive light pulse signals from the multiplexed channels. If none of the light beams in the curtain of light is interrupted by an obstruction the pulse trains from the preamplifier 72 and the feedback amplifier 48 will be comprised of equally spaced pulses having waveforms approximating that of the light intensity emission from the respective diodes. If one or more pulses are missing from the pulse trains an intrusion or obstruction is signified and the control subsystem, through the pulse detection means 34 will cause the relay 44 to be deenergized and the machine to come to an immediate stop. Referring now to FIG. 4a, the analog to digital converter 38 is illustrated in detail. The converter comprises a differentiator 110 which receives the incoming pulse train from the feedback amplifier 48 and differentiates the pulses. The output of the differentiator is applied to a comparator 112 which produces an output provided that the input is of given polarity which exceeds a predetermined amplitude. The differentiator 110 comprises an operational amplifier having a positive input connected to ground. The pulse train from the output of the feedback amplifier is applied through the coupling capacitor 114 and series resistor 116 to the negative input of the amplifier. The amplifier output is applied through a feedback resistor 118 and a parallel feedback capacitor 120 to the negative input of the amplifier. The output of the differentiator 110, as stated above, is applied to the comparator 112. The comparator comprises an operational amplifier and is provided with a threshold voltage at its reference input from a reference voltage source 122. The signal from the differentiator 110 is appied through a coupling resistor 124 to an inverting input of the comparator amplifier. This input signal is applied across a Zener diode 126 which is effective to bypass the positive pulses and to limit the amplitude of the negative pulses at the inverting input. The comparator amplifier is also provided with a strobe input from the pulse generator 32 with a pulse signal F (derived from the pulse generator 32 through an inverter 128 shown in FIG. 4b). The pulse signals F anf $\bar{F}$ are shown in the timing diagram of FIG. 2 and it is noted that the pulse F which strobes the comparator 112 has a leading edge which coincides with the trailing edge of the driver pulse $\bar{E}$ and hence the strobing pulses for the comparator 112 coincide with the negative input pulses on the inverting input of the comparator. Accordingly, the output of the comparator 112 is a train of positive pulses with one pulse occurring for each pulse input to the differentiator 110 provided that such input pulses have a trailing edge which has a time rate of change exceeding a predetermined value. (If the rate of change is less than the predetermined value the differentiated signal applied to the inverting input of the comparator will be less than the threshold voltage and no output pulse will be developed. The analog to digital converter 38, as just described, will only develop an output pulse in response to input pulses occurring coincidentally with the strobe pulse F (which coincides with the trailing edge of a light signal pulse) and only if the trailing edge of the input pulse has a time rate of change exceeding the predetermined value. Since the light emitting diodes exhibit extremely fast rise and cutoff times there is little probability that a noise pulse or false signal would have the required time rate of change and also occur in the "window" of the strobe pulse.

The output of the analog to digital converter 38 is applied to one input of the missing pulse detector 40.

Before describing the missing pulse detector 40 in detail it will be helpful to consider the analog to digital converter 36 which develops another input to the missing pulse detector. The analog to digital pulse converter 36 is provided for the purpose of developing a test signal indicative of the operability of the channel switching field effect transistors 70a, 70b, etc. Referring back to the timing diagram of FIG. 2 and to the pulse generator, as shown in FIG. 3, it will be noted that the pulse generator produces a pulse G toward the end of each channel cycle and after the driver pulse $\bar{E}$ has been applied to the light emitting diode. The pulse G is applied, as shown in FIG. 3, to the input 68 of the receiver channel multiplexer 28. Accordingly, the pulse G is applied through the multiplexer channel output to the gate of the field effect transistor (channel switch) 70a, 70b, etc. whichever is in the activated channel. The pulse G is effective to open the channel switch, i.e. it cuts off the field effect transistor, for the brief duration of the pulse. As a result the preamplifier 72 develops a train of output pulses with one pulse occurring during each channel cycle coincident with the occurrence of the pulse G. This train of pulses from the preamplifier 72 is applied to the input of the analog to digital converter 36. As shown in FIG. 4a, the converter 36 comprises an operational amplifier which has an inverting input connected with the voltage threshold source 122. A signal input of the amplifier is connected to the output of the preamplifier 72 through a resistor 132 and across a capacitor 134. A Zener diode 136 is connected across the input to limit the negative voltage input to a predetermined value. Thus the voltage at the signal input goes to zero when the channel switch (field effect transistor) is opened and remains at zero until the switch is closed. Consequently the voltage at the inverting input from the reference voltage source 122 causes the amplifier to produce a positive square wave output pulse during the interval of channel switch opening. The output of the analog to digital converter 36 is a train of pulses K with one pulse occurring during each channel cycle provided that the channel switch is functioning properly.

The missing pulse detector 40 is shown in detail in FIG. 4b and as previously explained is adapted to respond to the absence of one or more pulses in the train of output pulses J from the analog to digital converter 38; hence the missing pulse detector will produce a control signal in case one of the light beam channels in the light curtain is obstructed. As shown in FIG. 4b the missing pulse detector comprises a flip-flop 140 which has its J input connected with the output of the converter 38 and hence receives the train of pulses J. The K input is connected with the output of the converter 38 through an inverter 142. The clock input of the flip-flop 140 is connected with the strobe pulses F̄ from the pulse generator 32 through an inverter 144. The clear input of the flip-flop receives the timing pulse D1 from the clock 30. Accordingly, the Q output of the flip-flop is a positive pulse corresponding to each signal pulse J and having a leading edge coinciding therewith and a trailing edge coinciding with the negative going portion of the timing pulse D1. The missing pulse detector also includes an AND gate 146 which has an input connected with the output of the flip-flop 140 and has another input which receives the train of pulses K from the analog to digital converter 36 through buffers 148 and 152. Accordingly, when the signal pulse J is present and the channel switch test pulse K is present the AND gate 146 produces an output pulse. Thus the output of the gate 146 will be a train of pulses with one occurring in each channel cycle during the pulse K (and partially overlapping pulse G), with the train of pulses being continuous, i.e. with no missing pulse, unless one of the light beam channels is obstructed or unless the channel switch is not functioning. In order to detect the absence of a pulse G3 from gate 146, a flip-flop 154 and an identical redundant flip-flop 156 are provided. These flip-flops are adapted to produce a high output if the positive going portion of pulse Ḡ (see FIG. 2) is reached at a time when there is no G3 pulse present. For this purpose the D input of both flip-flops 154 and 156 is connected with the output of the gate 146 to receive the train of pulses G3. The C inputs of the flip-flops 154 and 156 are supplied with a train of pulses Ḡ from the pulse generator 32, the pulses being applied through inverters 158 and 160 respectively. The clear inputs of the flip-flops 154 and 156 are connected with test points in the latch 58 and as will appear later the test points are high when the starting circuit is functioning correctly and accordingly the clear inputs will not cause the Q̄2 and Q̄3 outputs of the flip-flops to go high so long as the starting circuit does not have a malfunction. For the present purpose, therefore, the clear inputs to the flip-flops 154 and 156 can be ignored. The Q̄2 and Q̄3 outputs of the flip-flops 154 and 156 will be low unless a negative going pulse is applied to the C inputs of the flip-flops without the presence of a positive pulse on the D inputs. Thus when the signal pulse G3 is present and overlaps the positive going portion of Ḡ the outputs Q̄2 and Q̄3 will remain low. If a signal pulse G3 is missing, the outputs Q̄2 and Q̄3 will become high and remain high until manual resetting of the starting circuit, which will be described later. The Q̄2 and Q̄3 outputs are connected with the stop circuits 60 and 190 as shown in FIG. 3. When the Q̄2 and Q̄3 outputs go high the stop circuits hold D1 and D2 high and the multiplexers stop on the channel.

The output of the missing pulse detector 40 is applied to the input of the relay drive 42 which will be described presently.

The relay drive 42 and the relay 44 are shown in detail in FIG. 4b within the dashed line rectangle labeled 42–44. The relay portion of the control subsystem is adapted to exercise control over the machine on which the intrusion detection system is installed; the relay itself as described herein is a part of the control subsystem and is adapted to control a circuit in the associated machine which will bring the machine to a stop or enable it to run, depending upon the condition of relay. Referring now to FIG. 4b, the relay drive comprises a NOR circuit 164 and an identical redundant NOR circuit 166. One input of the NOR circuit 164 is connected with the Q̄2 output of the missing pulse detector 40 which is low so long as no missing pulse is detected. The other input to the NOR circuit 164 is derived from the latch circuit 58 on conductor 168 which is low in the absence of a malfunction. Thus when there is no missing pulse, as indicated by the low output of the detector 40 and when there is no malfunction as indicated by the latch output, the NOR circuit 164 receives low inputs and produces a high output. In a similar manner the redundant NOR ciruit 166 receives a low input from the redundant flip-flop 156 of the missing pulse detector and it receives a low input from the output of the latch 158 on a conductor 172 when there is no malfunction. Accordingly, the NOR circuit 166 will produce a high under these conditions. The relay driver includes a transistor amplifier 174 having its base connected with the output of the NOR circuit 164 through a resistor 176 and across a resistor 178 and a capacitor 180. The transistor amplifier controls the energization of a control relay R1. For this purpose the emitter is connected directly to ground and the collector is connected through the winding 182 of the control relay to a voltage source. A protective diode 184 is connected across the winding 182. The control relay R1 includes relay contacts 182 shown in FIg. 4a. The NOR circuit 166 has its output connected with the input of a redundant transistor amplifier 174' which controls the energization of a redundant control relay R2. The transistor amplifier 174' is identical to amplifier 174 and corresponding components have the same reference characters with a ' symbol. Thus when the output of the NOR circuit 166 is high, the transistor amplifier 174' is fully conductive and the control relay R2 is energized. From the description just given with respect to the control subsystem it will be understood that when there is no obstruction in any of the light beam channels of the light curtain there will be no missing pulses in the signal pulse train applied to the missing pulse detector 40 and if the channel switches are functioning correctly the output of the missing pulse detector 40 will be continuously low. Further, if there are no malfunctions signified by the output signals from the latch 58, the control relays R1 and R2 will be energized and the machine will continue to run. However, upon the occurrence of either obstruction in the path of one of the light beam channels or the failure of one of the channel switches, or a malfunction as indicated by latch 58, the control relays R1 and R2 will be deenergized and the machine will be stopped.

The self-checking subsystem has been briefly desribed above with reference to FIG. 3. The self-checking subsystem will now be considered in greater detail with reference to both FIG. 3 and FIGS. 4a and 4b. It is desired for purposes of the self-checking subsystem to derive test signals from selected points in the control subsystem so that the aggregate of test signals will indicate whether any malfunction has occurred in the system. For this purpose the sender test multiplexer 52 is provided and has its channel address input connected with the clock 30 through a stop circuit 190 to the D2 timing signal output. It will be recalled that the timing signal D2 is identical to the timing signal D1 and therefore the test multiplexer 52 is operated synchronously with the channel multiplexer 26. The channel outputs $a, b, c$, etc. of the channel multiplexer 26 are connected respectively to the channel inputs $a', b', c'$, etc. of the test multiplexer 52. Accordingly, the output 192 of the test multiplexer 52 is supplied with a train of pulses $\bar{E}$ which, as previously noted, is fed through the channel multiplexer 26 from the pulse generator. The pulses $\bar{E}$ are the driver pulses for the light emitting diodes, as previous discussed. The output 192 of the test multiplexer therefore produces a train of pulses $\overline{MD}$ which as shown inverted as MD on the timing diagram of FIG. 2 coincides with the pulses $\bar{E}$ except for the inherent delay of the circuitry. The test signal MD is applied from the output 192 of the test multiplexer over a conductor 194 to a flip-flop 196 which produces $\overline{MD}$ which in turn is applied to the input of the master checker 51. Similarly, as shown in FIG. 3, the receiver test multiplexer 54 is provided for the purpose of developing a test signal for use in the self-checking subsystem. The test multiplexer 54 has its channel address input 198 connected with the clock 30 to receive the D2 timing signal through the stop circuit 190. Accordingly, the test multiplexer 54 is operated synchronously with the test multiplexer 52 and with the channel multiplexers 28 and 26. The channel outputs $a, b, c$, etc. of the channel multiplexer 28 are connected with the channel inputs $a', b', c'$, etc. of the test multiplexer 54. The output 200 of the test multiplexer 54 accordingly is provided with a train of pulses MT which is produced by the train of pulses G transmitted from the pulse generator 32 through the channel multiplexer 28. As shown in the timing diagram of FIG. 2 the pulses MT are synchronous with the pulses G and coincide therewith except for the inherent time delay of the circuitry. The test signal MT is applied through a flip-flop 202 to invert the signal and thus apply the test signal $\overline{MT}$ to the input of the master checker 51. Further, as noted on FIG. 3, the driver pulse $\bar{E}$ from the pulse generator 32 is applied through a conductor 204 as a test signal to the master checker 51. Also, as shown on FIG. 3, three test signals G3, K and Q (P1) are derived from the missing pulse detector 40 and applied to conductors 206, 208 and 210 respectively to the input of the master checker 5.

The self-checking subsystem including the flip-flops 196 and 202, the master checker 51, the missing pulse detector 56 and the latch 58 are shown in detail in FIG. 4b. The flip-flip stage 196 comprises a flip-flop 214 and a redundant flip-flop 216 and are adapted to invert the test signal $\overline{MD}$ for application to the master checker 51. The preset input of the flip-flops 214 and 216 are connected through a conductor 218 to the pulse generator to receive the train of pulses $\bar{F}$ which occurs just after the driver pulse $\bar{E}$ for the light emitting diodes. Accordingly, during each channel cycle and in preparation for the succeeding channel cycle the flip-flops 214 and 216 are preset so that the Q output thereof is low.

The D inputs of the flip-flops 214 and 216 are connected through a conductor 220 to ground and the C inputs of the flip-flops are supplied with the MD test signal from the output 192 of the test multiplexer 52. In this arrangement the Q outputs of the flip-flops 214 and 216 will produce the inverse of the C inputs. Accordingly, it is noted with reference to FIG. 2 that the MD test signal when operating correctly is low until the driver pulse $\bar{E}$ occurs and then the test signal MD goes high. Accordingly, during its coincident period with the E signal the inverse of the pulse MD is low, i.e. the test pulse $\overline{MD}$ is low during the time it coincides with the $\bar{E}$ pulse.

The flip-flop circuit 202 includes a flip-flop 222 and a redundant flip-flop 224. These flip-flops function in the same manner as just described with reference to the flip-flops 214 and 216 and the description will not be repeated. It is noted that the C inputs to the flip-flops 222 and 224 receive the test signal $\overline{MT}$ from the test multiplexer 54. Accordingly, in the absence of a malfunction the Q outpus from flip-flops 222 and 224 are low during that period in which the output coincides with the driver pulse $\bar{E}$. Thus the outputs of the flip-flops 214 and 216 on conductors 226 and 228 correspond to $\overline{MD}$ and are low in the absence of a malfunction. Similarly, the outputs of the flip-flops 222 and 224 on conductors 230 and 232 represent the test signal MT and are low in the absence of a malfunction. These outputs are applied to the input of the master checker 51 along with the other test signals.

The master checker 51 comprises a combination of NOR circuits and a NAND circuit which coact in such a manner that if all of the test signals which are applied to the master checker are low, then the single output of the master checker will also be low. The test signals selected from the points in the control subsystem as an indication of malfunction are either low in the absence of a malfunction during coincidence with the driver pulse E or, as in the case of test signals $\overline{MD}$ and MT, if the signals are always low (malfunction or not) during coincidence with the driver pulse $\bar{E}$, then the signal is inverted prior to application to the master checker 51. In the master checker the driver pulse $\bar{E}$ is used in the manner of a strobe signal so that the check for malfunction occurs during the pulse $\bar{E}$ on every channel cycle. The test pulses $\overline{MD}$ are applied in the master checker to the inputs 226 and 228 of a NOR circuit 234 and the test signal MT is applied to the inputs of the NOR circuit 234 through conductors 230 and 232. The same input signals are applied to the redundant NOR circuit 236. Accordingly, when all of the inputs to these NOR circuits are low the outputs will be low. The outputs of the NOR circuits 234 and 236 are applied to inputs of the NAND circuit 238. The test pulse $\bar{E}$ serving as a strobe for the master checker is applied to one input of a NOR circuit 240 and the test signals K, J and G3 from the missing pulse detector 40 are applied to separate inputs of the NOR circuit 240. As noted from the timing diagram of FIG. 2, the test signals K, J and G3 are all normally low, i.e. in the absence of a malfunction during the occurrence of the strobe or test pulse $\bar{E}$. The same inputs as applied to the NOR circuit 240 are also applied to the redundant NOR circuit 242. When all of the inputs are low the NOR circuits 240 and 242 produce a low output and if any of the inputs are high, the outputs will be high. The outputs of the NOR circuits 242 and 240 are applied to separate inputs of the NAND circuit 238 which will produce a high output during each of the E̅ pulses provided that all of the inputs are low. Accordingly, so long as there is no malfunction the output of the NAND circuit 238 and hence the master checker 51 will be a train of positive pulses. However, if a malfunction should occur and persist during the occurrence of the pulse E̅, the train of output pulses from the master checker 51 will cease. The output from the master checker 51 is applied to the input of the missing pulse detector 56.

The missing pulse detector 56 is adapted to detect the absence of a pulse in the output of the master checker 51. This is accomplished by a retriggerable monostable multivibrator 250, the multivibrator 250 has its A input connected with the output of the master checker 51 and it has its clear input connected through a conductor 252 to the output of the relay test stage 59. This output is normally low in the absence of a malfunction of the relay and therefore it does not affect the Q output of the multivibrator 250. The multivibrator 250 operates upon the receipt of a high signal at its A input to produce a low output so long as the high input exists and then for a predetermined time interval after termination of the high input. This predetermined time interval is greater than the normal interval between output pulses from the master checker 51. Accordingly, so long as there is no missing pulse in the train of pulses from the master checker 51, the Q output of the multivibrator 250 will be low. However, if there is a missing pulse the output of the multivibrator 250 will go high and remain there until it is reset. A redundant retriggerable monostable multivibrator 252 is also provided in the missing pulse detector 56 and is provided with the same input and operates the same manner as the multivibrator 250.

The self-checking subsystem further includes a latch 58 shown in detail in FIG. 4b. The output of the missing pulse detector 56 is applied to the input of the latch 58; in particular the output of the multivibrator 250 is applied to one input of a NAND circuit 260. The other input of the NAND circuit 260 is connected with the output 262 of the start circuit 264. The output of the start circuit is normally high during operation and will remain high unless there is a malfunction in the start circuit. Accordingly the NAND circuit 260 receives a low input from the multivibrator 250 and receives a high input from the start circuit output 262 under normal operating conditions. Accordingly, the NAND circuit 260 produces a high output which is applied to the preset input of a flip-flop 266. The clear input of the flip-flop 266 is connected with the output of the start circuit and thus in normal conditions is high. With these inputs to the flip-flop 266 the Q output is low and this output is applied through a conductor 172 to an input of the NOR circuit 164 in the relay drive circuit 42. As previously described, this input to the relay drive circuit 42 from the latch 58 allows the relay R1 to remain energized. However, if the missing pulse detector 56 produces a high output which will occur in the event of a missing pulse signifying a malfunction, the flip-flop 266 will produce a high output which will cause the NOR circuit 164 to go low and the relay R1 will be deenergized to stop the machine. The latch 58 includes a redundant NOR circuit 260' and a redundant flip-flop 266' which are identical to the NOR circuit 260 and the flip-flop 266. The output of the redundant flip-flop 266' is applied, as previously described, through conductor 168 to one input of the NOR circuit 166 in the relay drive circuit 42. The operation of the redundant circuits 260', 266' and 166 is the same as described with reference to circuits 260, 266 and 164.

The start circuit 264 comprises a Schmitt trigger 280 which has a signal voltage applied to its input through a resistor 282 across a capacitor 284. Supply voltage is applied to the input 286 only when the machine is turned on by the on switch. The output of the Schmitt trigger 280 is applied through an inverter 288 to the output 262 and likewise through a redundant inverter 290 to the output 262'. When the power supply is first turned on at the input 286 of the Schmitt trigger the output thereof is initially high and after the trigger switches the output thereof become low. Accordingly, the inverter outputs 262 and 262' are initially low and then are switched to high for steady-state operation. The operation of the start circuit 260 thus is used to reset the latch 58 so that its output is low. Also, the start circuit 284 or one of similar arrangement may be used to reset all counters associated with the multiplexers to zero and thus start the multiplexers at the first channel. In order to check the starting circuit for operability the output of the converter 288 is applied through a conductor 292 to the clear input of the multivibrator 154 and similarly the output of the inverter 290 is applied through a conductor 294 to the clear input of the redundant multivibrator 156. If during operation the output of the start circuit 264 should go low it is set high, thus signifying a malfunction or no-signal, and accordingly the control relays are deenergized and the machine is stopped.

The self-checking subsystem also includes a relay test stage 59 which is shown in detail in FIG. 4a. The relay test stage is adapted to determine whether the relay contacts 182 of relay 1 and the relay contacts 184 of the redundant relay 2 are in the same, or corresponding, positions. For this purpose a voltage source is connected through a resistor 296 to the fixed contact 302 of relay 1 and the fixed contact 304 of relay 2. The other fixed contact 306 of relay 1 is connected through a red signal light to ground and is also connected through a diode 308 and a resistor 310 to the input network 312 of a comparator 314 and a redundant comparator 314'. Similarly the other fixed contact 316 is connected through a green signal lamp 318 to ground and also through a diode 320 and the resistor 310 to the voltage dividing network 312. The output of the voltage dividing network 312 is applied to an inverting input of the comparator 314 and to the inverting input of the redundant comparator 314'. The other inputs of the comparator are connected to a reference voltage source 322. When the relay contacts 182 and 184 are in corresponding positions, i.e. in engagement with fixed contacts 302 and 316 respectively (relays energized and machine running) the green light 318 is energized and a high or positive voltage is developed by the voltage dividers 312. Accordingly the inverting inputs of the comparators go low and a low output is produced by the comparators 314 and 314'. The output of the comparator 314 is applied through an inverter 322 through a conductor 324 to the clear input of the multivibrator 250. Similarly, the output of the comparator 314' is applied through an inverter 322' and a conductor 324' to the clear input of the multivibrator 252. A high voltage to the clear input of the multivibrator 250 does not affect the output thereof. However, a low voltage to the clear input sets the Q output of the multivibrator to high. This has the effect of a missing pulse and the output of the latch is set to high and the relays are deenergized and the machine is stopped. In operation of the relay test stage 59, when the relay contacts 182 and 184 are both in the position shown, or when they are both in the opposite position, the corresponding red or green signal light will be energized and the output of the relay test stage will be high. Accordingly, there will be no affect on the operation of the control relays and the machine. However, if either of the relay contacts 184 or 182 is in the opposite position from that shown, the output of the relay test stage 59 will be low and the multivibrators 250 and 252 will be set high and the latch 58 will cause the relays to be deenergized and the machine stopped.

The operation of the presence detection system may be summarized as follows: the control system including the channel multiplexers 26 and 28 under the control of the clock 30 and the pulse generator 32 causes the light emitting diodes 20a, 20b, etc. to be energized sequentially one at a time. The light beam from the diode impinges on the corresponding phototransistors 22a, 22b, etc. provided there is no obstruction in the light beam path and the signal pulse produced by the phototransistor supplied through the preamplifier 72 and the feedback amplifier 48 to the pulse detection means 34. Prior to the occurrence of the driving pulse for the light emitting diodes the feedback switch 50 is closed and the bias level of the phototransistor is adjusted to compensate for changes in the ambient light and temperature. The signal pulses are processed by the converters 36 and 38 and the missing pulse detector 40 which, through the relay drive 42, deenergizes the relay 44 in case of the absence of a pulse in the signal pulse train, as would be caused by an obstruction in one of the light beam channels.

The self-checking subsystem utilizes test signals derived from selected points in the control subsystem and causes the machine to stop in the event of any malfunction. The test multiplexers 52 and 54 produce test signals which in the low state indicate that each multiplexer is properly synchronized with each other multiplexer. The signals MT and $\overline{\text{MD}}$ are applied to the master checker 50. A test signal K, indicative of the operability of the channel switch, is derived from the missing pulse detector 40 and applied to the master checker 50. Also, a test signal Q (P1) indicative of the proper light signal pulse production, is derived from the missing pulse detector 40 and applied to the master checker 50. Additionally, the test signal G3, indicative of proper output from the missing pulse detector, is applied from the missing pulse detector 40 to the master checker 50. Additionally, the driver pulse signal $\overline{\text{E}}$ which is used to energize the light emitting diode is employed as a test signal in the master checker and may be regarded as a strobe for operation thereof. When all of the test signals are low during the occurrence of the pulse $\overline{\text{E}}$ the output of the master checker is low and proper functioning of the control system is indicated. However, if any one of the test signals is high during the occurrence of the pulse $\overline{\text{E}}$, the output of the master checker is set high and the missing pulse detector 56 sets the latch 58, which in turn deenergizes the relays and turns off the machine. With the latch set the presence detection system cannot be operated until the malfunction is corrected.

Although the description of this invention has been given with respect to a particular embodiment, it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. A presence detection system comprising a plurality of light source and photodetectors arranged in plural sets with a light source and a photodetector in each set, the source and photodetector of each set defining a channel and being disposed so that light from the source impinges upon the photodetector in the absence of an obstruction in the channel, each photodetector adapted to produce an electrical pulse when excited by a light inpulse, pulse generating means for energizing the light sources, a sender channel multiplexing means having an input connected with the pulse generating means and having plural channel outputs each connected with a different one of the light sources and having channel switching means with a channel address input, a clock connected with the channel address input for sequentially connecting the light sources to the pulse generating means, a pulse detection means having an input adapted for connection with one of the photodetectors, a receiver channel multiplexing means having plural channel outputs each corresponding with a different one of the photodetectors and having channel switching means with a channel address input, a switch connected between each photodetector and pulse detection means and being connected with the corresponding channel output of the receiver channel multiplexing means, said clock being connected with the channel address input for sequentially connecting the photodetectors to the input of pulse detection means, whereby said multiplexers are switched synchronously by the clock and said channels are sequentially activated with each channel being activated during an activation interval determined by the clock, said pulse generating means being synchronized with the clock to produce a pulse during the activation interval of each channel for transmitting a light pulse from the light source to the photodetector of the same set, said photodetectors thereby being sequentially excited by light impulses whereby said pulse detection means receives at its input a train of pulses including a pulse corresponding to each of the activated channels in the absence of an obstruction in any of the activated channels, said pulse detection means including detector means responsive to a missing pulse in said train of pulses.

2. The invention as defined in claim 1 including biasing means connected with each of said photodetectors for varying the electrical output thereof produced by a given light impulse, a feedback amplifier having its input connected with the output of the photodetector and its output connected with said bias means, said amplifier being adapted to produce an output so that its input is equal to a predetermined level when its output is connected with said bias means, and switching means connected in the output of said amplifier to connect it with the bias means, said switchig means being connected with said pulse generating means and being operative to connect the amplifier to the biasing means during the time interval between light impulses and to disconnect it from the biasing means during the light impulses whereby the photodetector is compensated for changes of ambient conditions.

3. The invention as defined in claim 1 including a binary comparator adapted to compare the binary state of plural binary signals and having a plurality of inputs and an output, means connecting the plural channel outputs of said sender channel multiplexing means with one of said inputs, means for connecting said plural channel outputs of said receiver channel multiplexing means to one of said inputs, means for connecting said pulse generating means to one of said inputs, disabling means having an input connected with said pulse detection means and said disabling means also having an input connected with the output of said comparator.

4. The invention as defined in claim 3 wherein said detector means is connected with another one of said inputs of said comparator means.

5. The invention as defined in claim 4 wherein said means connecting the plural channel outputs of the sender channel multiplexing means comprises a sender channel test multiplexer and wherein said means connecting the plural channel outputs of the receiver channel multiplexing means comprises a receiver channel test multiplexer.

6. The invention as defined in claim 3 including multiplexer stop means connected between said clock and said multiplexers and being connected with said detector means whereby said multiplexers are stopped upon the occurrence of a missing pulse.

* * * * *